US012748863B2

(12) United States Patent
Shemer et al.

(10) Patent No.: US 12,748,863 B2
(45) Date of Patent: Sep. 29, 2026

(54) USING INQ TO OPTIMIZE END-TO-END ENCRYPTION MANAGEMENT WITH BACKUP APPLIANCES

(71) Applicant: EMC IP Holding Company LLC, Hopkinton, MA (US)

(72) Inventors: Jehuda Shemer, Kfar Saba (IL); Arieh Don, Newton, MA (US); Krishna Deepak Nuthakki, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 245 days.

(21) Appl. No.: 18/444,539

(22) Filed: Feb. 16, 2024

(65) Prior Publication Data

US 2024/0232391 A1 Jul. 11, 2024

Related U.S. Application Data

(63) Continuation of application No. 17/343,532, filed on Jun. 9, 2021, now Pat. No. 11,983,281.

(51) Int. Cl.

| | |
|---|---|
| ***G06F 21/60*** | (2013.01) |
| ***G06F 11/1446*** | (2026.01) |
| ***H04L 9/08*** | (2006.01) |

(52) U.S. Cl.

CPC ........ *G06F 21/602* (2013.01); *G06F 11/1453* (2013.01); *G06F 11/1469* (2013.01); *H04L 9/0894* (2013.01); *G06F 2201/84* (2013.01)

(58) Field of Classification Search

CPC ............... G06F 21/602; G06F 11/1453; G06F 11/1469; G06F 2201/84; G06F 11/1458; G06F 21/6218; H04L 9/0894; H04L 9/16; H04L 9/40

See application file for complete search history.

(56) References Cited

U.S. PATENT DOCUMENTS 7,899,189 B2 * 3/2011 Dawson ................ H04L 9/0894 380/255
8,416,954 B1 4/2013 Raizen et al.
8,429,425 B2 * 4/2013 Ko ...................... G06F 11/1458 713/193
8,924,700 B1 12/2014 Karmarkar et al.

(Continued)

OTHER PUBLICATIONS

Bharadwaj et al., "Proposing a Key Escrow Mechanism for Real-Time access to End-to-End encryption systems in the Interest of Law Enforcement", Oct. 2018, 3rd International Conference on Contemporary Computing and Informatics, pp. 233-237 (Year: 2018).*

(Continued)

*Primary Examiner* — Kenneth W Chang
(74) *Attorney, Agent, or Firm* — Workman Nydegger

(57) ABSTRACT

One example method includes receiving, by a backup appliance, a request concerning a dataset, performing, by the backup appliance, an inquiry to determine if end-to-end encryption is enabled for a volume of a target storage array, receiving, by the backup appliance, confirmation from the storage array that end-to-end encryption is enabled for the volume, and based on the confirmation that end-to-end encryption is enabled for the volume, storing the dataset in the volume without performing encryption, compression, or deduplication, of the dataset prior to storage of the dataset in the volume.

20 Claims, 4 Drawing Sheets

(56) References Cited

U.S. PATENT DOCUMENTS

| | | | | |
|---|---|---|---|---|
| 9,338,005 | B2 * | 5/2016 | Fascenda | H04L 9/0891 |
| 10,628,073 | B1 * | 4/2020 | Zhao | G06F 3/0608 |
| 2006/0005048 | A1 * | 1/2006 | Osaki | G06F 21/6218 713/193 |
| 2008/0005477 | A1 | 1/2008 | Dale et al. | |
| 2008/0082835 | A1 | 4/2008 | Asher et al. | |
| 2008/0101605 | A1 | 5/2008 | Kitamura et al. | |
| 2008/0240434 | A1 | 10/2008 | Kitamura | |
| 2009/0164780 | A1 | 6/2009 | Murayama et al. | |
| 2015/0006890 | A1 | 1/2015 | Roth et al. | |
| 2016/0110262 | A1 * | 4/2016 | Nanivadekar | G06F 11/1469 707/654 |
| 2017/0249467 | A1 | 8/2017 | Mueller et al. | |
| 2019/0065788 | A1 * | 2/2019 | Vijayasankar | G06F 3/0673 |
| 2019/0236284 | A1 | 8/2019 | Hersans | |
| 2019/0340136 | A1 * | 11/2019 | Irwin | G06F 3/0608 |

OTHER PUBLICATIONS

Mogarala et al., "Security and privacy designs based data encryption in cloud storage and challenges: A review", Jul. 2018, 9th International Conference on Computing, Communication and Networking Technologies, pp. 1-7 (Year: 2018).

* cited by examiner

USING INQ TO OPTIMIZE END-TO-END ENCRYPTION MANAGEMENT WITH BACKUP APPLIANCES

FIELD OF THE INVENTION

Embodiments of the present invention generally relate to data encryption. More particularly, at least some embodiments of the invention relate to systems, hardware, software, computer-readable media, and methods for end-to-end encryption in data backup environments.

BACKGROUND

In End-to-End Encryption (EEE) or Host Encryption, data is encrypted by the host and is sent encrypted to the storage array. Storage arrays like PowerMax are aware if a device/LUN is part of EEE, and those arrays may manage keys and encryption/decryption accordingly. However, backup applications and appliances, such as may be employed to back up the data in the storage array, are not always aware that the data is an EEE volume and thus may treat the data in a conventional manner. As discussed below, this may present problems.

For example, the backed up data is exposed for testing or Instant Access (IA), the fact that the backed up data is encrypted may mean that the data is not useful for these purposes unless the user manually manages decryption and key management for the encrypted backed up data.

Another problem is that when the encrypted backup data is restored to a target, such as another storage array, the target is unaware that the data is encrypted. As such, the restored data is of no use to the user unless the user manually manages the decryption and keys management.

As another example of problems with conventional approaches, encrypted storage array data that is to be backed up may be re-encrypted by the backup system. Such re-encryption provides no value, since the data is already encrypted, and needlessly consumes computing resources that could be directed to other tasks.

Finally, when the encrypted data is received from the storage array for backup, a backup appliance may attempt to deduplicate (dedup) and compress the encrypted data. However, because the data is encrypted, it cannot be usefully deduplicated or compressed. Thus, attempts to dedup and/or compress the data do not accomplish useful results, and also waste computing resources.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
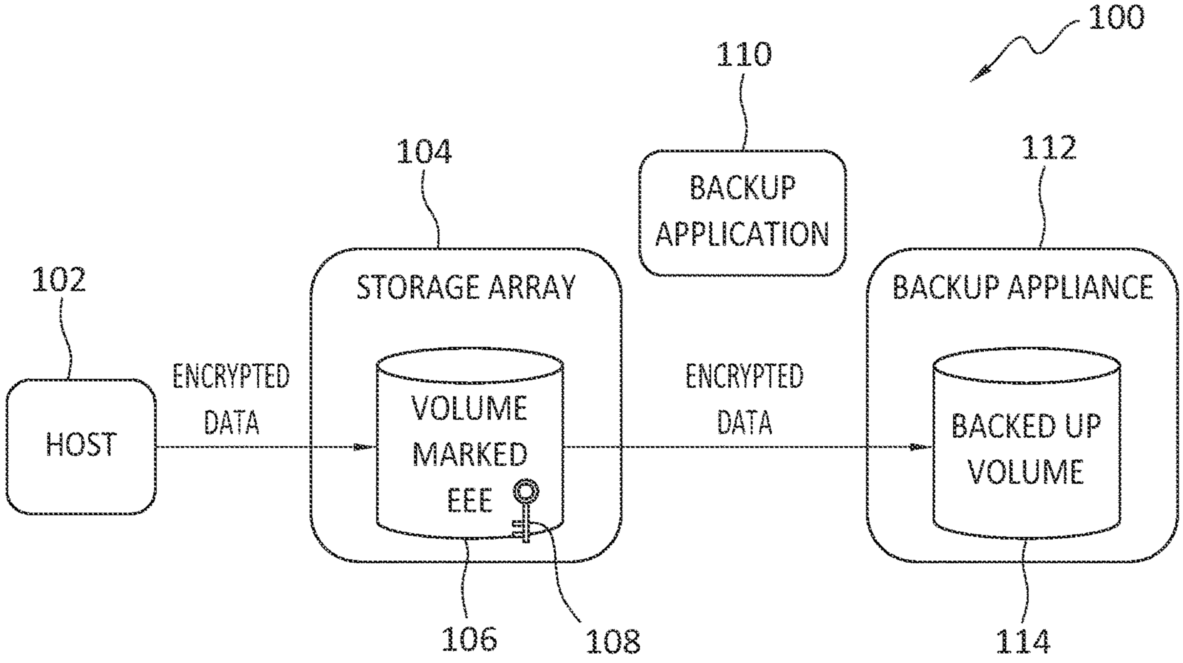
FIG. 1 discloses aspects of an example architecture and operating environment.

Embodiments of the present invention generally relate to data encryption. More particularly, at least some embodiments of the invention relate to systems, hardware, software, computer-readable media, and methods for end-to-end encryption in data backup environments.

In general, example embodiments of the invention may use an array INQ (Inquiry Utility) or comparable command, such as an NVMe (Non Volatile Memory-express) get features command, or similar, so that the storage array can expose the fact that EEE is enabled for a device. At backup time, or another time, a backup appliance may query this capability of the storage array and will not attempt to encrypt, compress, or dedup, the data received from the storage array if the storage array indicates that a storage array LUN is marked EEE. Instead, the backup appliance may mark the data received from the storage array as EEE, and the backup appliance may use a secure communication channel to the array to automatically retrieve the encryption/decryption key from the storage array, or from a user. The retrieved key may then be stored securely by the backup appliance as part of the backup. In some embodiments, the backup appliance/application may use the key to decrypt the backup saveset, and then compress and/or deduplicate the backup saveset prior to storage. After compression and/or deduplication are performed, the backup appliance/application may then encrypt the saveset. As well, the backup appliance/application may use the key to decrypt the backup in IA or restore scenarios. Further, when restoring the backup to a target, the target array may be notified that the backup is EEE and, in response, the target array may ensure that the LUN at the target array is set up, including with the key, the same as the original LUN. Embodiments of the invention may implement these functions without any manual user operation required. An authorization scheme may be implemented to ensure that proper user authorization is required for key access. Thus, example embodiments may provide for a streamlined user experience, and efficient use of backup appliance/application compute resources.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

In particular, one advantageous aspect of at least some embodiments of the invention is that computing resources may be conserved through awareness, on the part of the backup application and/or backup appliance, that a backup saveset received from a storage array has been end-to-end encrypted. As another example, an embodiment may obviate the need for a backup appliance and/or backup application to encrypt, compress, and/or, dedup data, when the data is being backed up. As a final example, an embodiment may obviate the need for a backup appliance and/or backup application to decrypt, decompress, and/or, dedup data, when the data is being restored to a target.

It is noted that embodiments of the invention, whether claimed or not, cannot be performed, practically or otherwise, in the mind of a human. As indicated by the illustrative examples disclosed herein, embodiments of the invention are applicable to, and find practical usage in, environments in which large numbers, such as tens of thousands or more, devices are being backed up and/or restored by a data protection system. As well, the device data that is being backed up and/or restored may also be encrypted/decrypted, compressed/decompressed, and/or, deduplicated. Such processes are well beyond the mental capabilities of any human to perform practically, or otherwise. Thus, while other, simplistic, examples are disclosed herein, those are only for the purpose of illustration and to simplify the discussion, but do not represent real world applications of embodiments of the invention. Accordingly, nothing herein should be construed as teaching or suggesting that any aspect of any embodiment of the invention could or would be performed, practically or otherwise, in the mind of a human.

A. Aspects of an Example Architecture and Environment

The following is a discussion of aspects of example operating environments for various embodiments of the invention. This discussion is not intended to limit the scope of the invention, or the applicability of the embodiments, in any way.

In general, at least some example embodiments of the invention may be implemented in connection with systems, software, and components, that individually and/or collectively implement, and/or cause the implementation of, data protection operations and other data related operations, which may include, but are not limited to, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention may provide for the implementation of the disclosed functionality in existing backup platforms, examples of which include the Dell-EMC NetWorker and Avamar platforms and associated backup software, storage environments such as the Dell-EMC DataDomain storage environment, and storage components such as the Dell-EMC PowerMax storage arrays. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients and hosts that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

Finally, as used herein, the term 'backup' is intended to be broad in scope. As such, example backups in connection with which embodiments of the invention may be employed include, but are not limited to, full backups, partial backups, clones, snapshots, and incremental or differential backups.

B. Aspects of Some Example Embodiments

As noted herein, conventional systems and approaches may be such that a backup application or backup appliance blindly reads and restores EEE data from/to a primary storage array and, in so doing, wasting resources and failing to provide the end user with a proper experience and backup protection. Thus, some example embodiments may employ a command, such as an INQ command for example, to publish whether EEE is in use, and to share keys already stored on the array with the backup appliance in order to allow proper handling of the EEE data.

With reference now to FIG. 1, aspects of an example system 100 are disclosed. In general, and as shown, the system 100 may include one or more hosts 102, or clients, that may host applications which generate data. The data may be encrypted by the host 102 and transmitted by the host 102 to a storage array 104 for storage. The storage array 104 may include one or more volumes 106 marked as EEE. That is, the volumes 106 may be marked or designated as holding data that has been end-to-end encrypted. More particularly, with EEE, the host 102 may encrypt the data and send the encrypted data to the storage array 104. The storage array 104 may be aware that the volume 106 is EEE. A user may have the option to authorize the storage array 104 to keep a key 108 on the storage array 104, although this is not mandatory. The key 108 may be used to decrypt the encrypted data received by the storage array 104 from the host 102.

A backup application 110 may create a backup dataset that includes the encrypted data stored at the storage array 104. The backup dataset may be stored at a backup appliance 112 that may include one or more back up volumes 114 that store backup datasets.

In operation, the backup appliance 112 may use standard SCSI (Small Computer System Interface), NVMe, or similar, to query the storage array 104 using a command, such as a SCSI INQ command, that will expose if the volume 106, which may be a storage array 104 LUN, is EEE-enabled. Example equivalent alternatives are SCSI vendor-specific commands, NVMe get features, or similar options in other interface protocols.

If it is established, through use of INQ or a comparable command, that the volume 106 is EEE, and user authorization was given, the backup appliance 112, or the backup application 110 on behalf of the backup appliance 112, may automatically retrieve, such as by way of a secure communication channel, the encryption key 108 from the storage array 104, and securely store the key 108 in the backup volume 114 as part of the backup. It is noted that a key need not necessarily be stored as part of, or with, a backup. Thus, in some alternative embodiments, a key may simply be associated with, but not stored as part of, or with, a backup. A key and a backup with which the key is associated may be securely stored on separate respective entities, so long as the backup appliance is able to access and retrieve the backup and the associated key. The backup appliance 112 may not encrypt, compress or dedup the data of this backup. The EEE notification and key 108 may be part of the backup and may be transferred with the backup in case of remote backup, replication or archiving of the backup dataset. In other embodiments, the backup appliance 112 may use the key 108 to decrypt the backup saveset created by the backup application 110 with data from the storage array 104, and may then compress and/or deduplicate the backup saveset prior to storage in the backup volume 114. After compression and/or deduplication are performed, the backup appliance 112 may then encrypt the saveset and store the encrypted saveset in the backup volume 114.

When a user wants to access the backup image stored in the backup volume 114 of the backup appliance 112, if the backup appliance 112 has the key 108, the backup appliance 112 may decrypt the backup data as part of the process that exposes the backup image to the user. If this decryption is not performed, then the user may be notified that the volume 106 and/or volume 114 is an encrypted volume and a key must be given by the user in order to access the data, that is, the backup image to which access was requested by the user.

In addition to providing user access to a backup image stored at the backup appliance 112, for example, embodiments of the invention may also provide for restoration of a backup to another volume, that is, a volume other than the volume 106 from which the data was backed up. As well, embodiments of the invention may provide for restoration of a backup to another storage array, that is, a storage array other than the storage array 104 from which the data was backed up. In either case, whether the backup is restored to another volume or storage array, the backup appliance 112 may be aware of whether or not the target volume is an EEE volume. As part of the restore, the target volume of the storage array may be marked accordingly, and the key 108 transferred by the backup appliance 112 to the target volume. In this case, there may be no need for the backup appliance 112 to decrypt, decompress or dedup when transferring the data to the array, since the target volume of the storage array may have received the key 108 from the backup appliance 112. Rather, decryption, decompression, and/or, dedup, of the restored backup dataset may be performed, using the key 108, at the EEE target volume.

Further, when restoring the backup to a target, the target storage array may be notified that the backup is EEE and, in response, the target array may ensure that the LUN at the target storage array is set up, including with the key, in the same way as the original LUN. Note that 'LUN' (Logical Unit Number) refers to a number that is used to identify a logical unit. The logical unit may be a device, such as a storage device, addressed by a particular protocol, such as the SCSI protocol, or SAN (Storage Area Network) protocols which use SCSI, such as FC (Fibre Channel).

Thus, as disclosed herein, example embodiments may serve to expose EEE-enabled storage volumes, and may interact with backup functionality in order to create a more efficient solution and a streamlined experience to the user. To these ends, embodiments may use an INQ command, or similar, to expose EEE storage volumes, and/or embodiments may use EEE information in backup operations to optimize use of computing resources, and improve a user experience.

C. Example Methods

Figure 2:
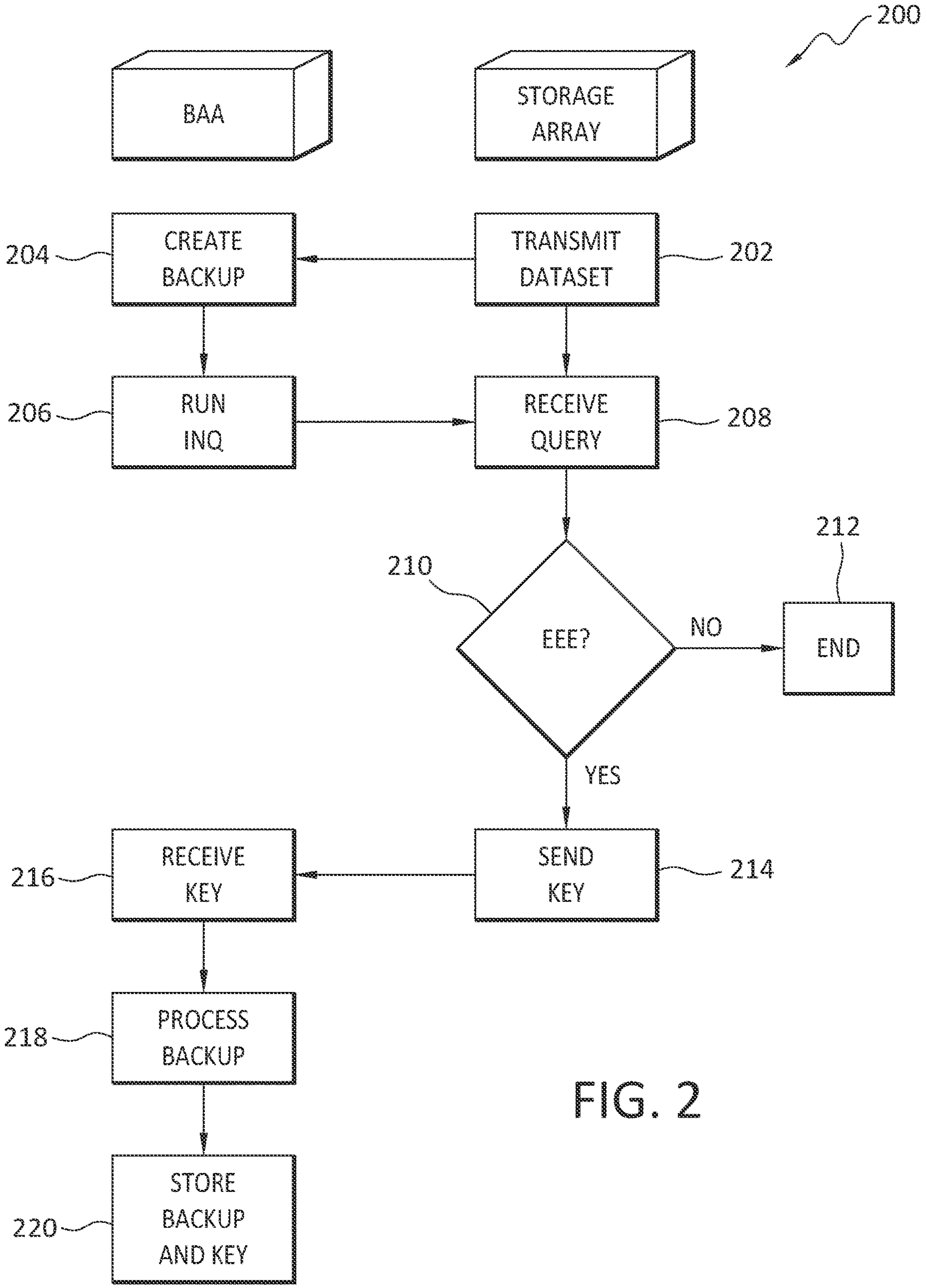
FIG. 2 discloses aspects of an example method for using INQ commands to optimize EEE management with backup appliances.

It is noted with respect to the example method of FIG. 2 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Directing attention now to FIG. 2, an example method 200 is disclosed which may employ INQ commands to optimize EEE management with backup appliances. The method 200 may be performed in connection with a storage array, and a backup application and/or backup appliance (individually, and collectively, 'BAA').

The method 200 may begin when an encrypted dataset is transmitted 202 from a storage array to a BAA for backup. The BAA may create a backup 204 of the encrypted dataset, and creation of the backup 204 may include marking the data in the backup as EEE. Next, the BAA may run a command 206, such as an INQ command for example, to determine whether a volume holding the data from which the backup was created 204 is EEE enabled. This query may be received 208 by the storage array, and the storage array may determine 210 whether or not that volume is marked as EEE. Note that the INQ command may be run before the backup is created 204.

If the volume is not marked EEE, the method 200 may end, 212. On the other hand, if the volume is marked EEE, the storage array may send 214, to the BAA, an encryption/decryption key that may be used to decrypt the encrypted data of the backup, and to re-encrypt the decrypted data. The BAA may receive 216, the encryption/decryption key. The backup data may, or may not, then be processed 218 by the BAA. Such processing may include, but is not limited to, decryption using the key, compression, and/or deduplication. If such processing 218 is performed, the data of the backup dataset may then be re-encrypted using the key. This key may be used by the BAA in various scenarios such as, for example, when a user requests access to a backup image, that is, IA (Image Access), and when the backed up data is to be restored to a target.

Finally, the BAA may store the key together with the backup 220. The key and backup may be retrieved later for use in an IA or restore process, for example. As noted elsewhere herein, it is not necessary in every embodiment that a key be stored as part of, or with, a backup with which that key is associated. For example, the key may be associated with the backup, but stored separately from the backup.

Figure 3:
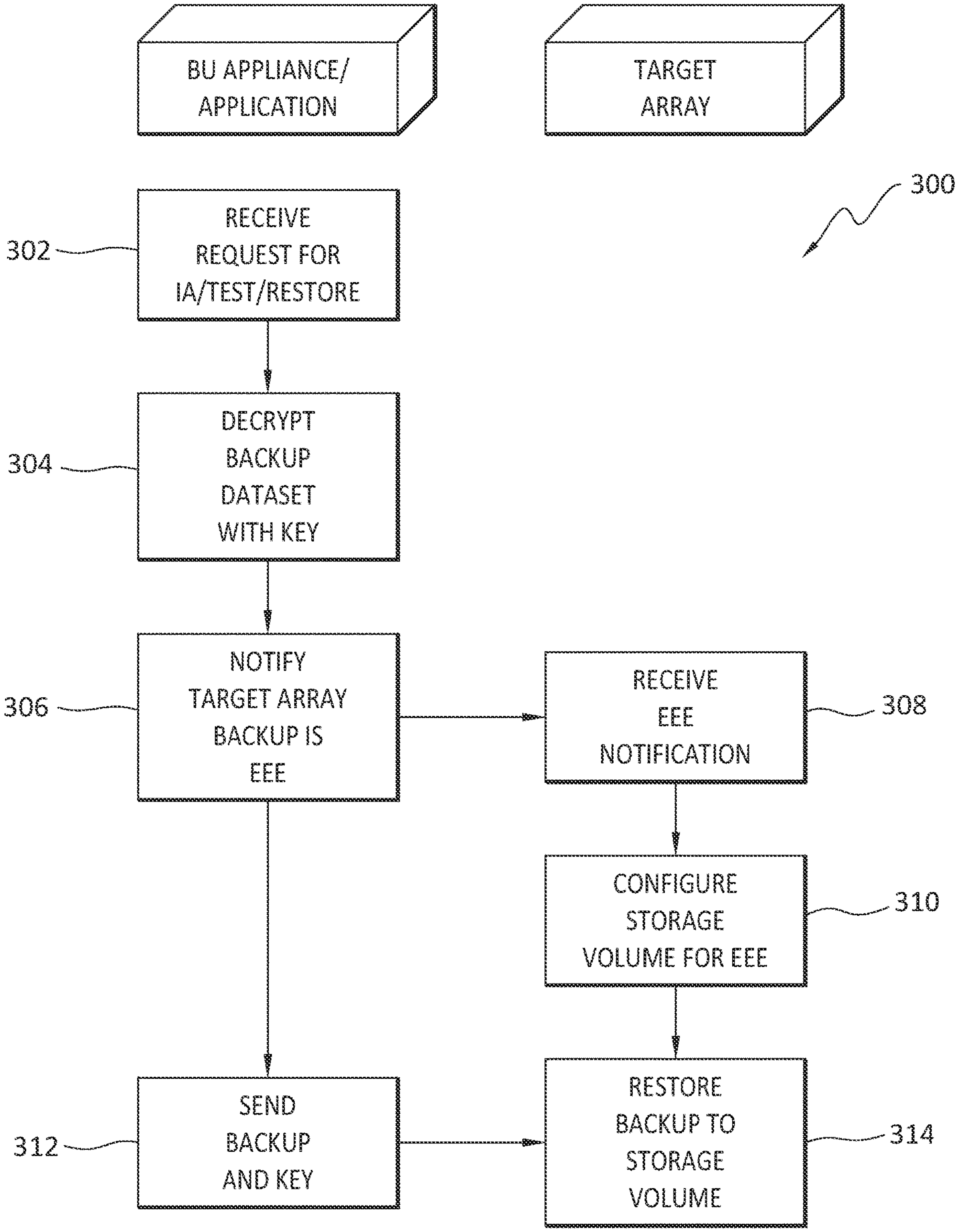
FIG. 3 discloses aspects of an example method for servicing IA and restore requests.

With reference next to FIG. 3, an example method 300 is disclosed in which various processes involving the backed up dataset and/or key may be performed. Initially, a BAA may receive 302 a request of some type concerning the backed up dataset. The request may, for example, be for image access so that a user can access the backup image, or the request may be a request to use the dataset for testing purposes, or the request may be to restore the dataset to a target storage array, which may or may not be the same storage array that stored the data prior to creation of the backup. That is, the dataset may be restored to a domain other than the one where the dataset was initially created.

When the request received 302 by the BAA is for image access, if the BAA has the decryption key, the BAA may decrypt 304 the encrypted backup dataset. If the BAA does not have the decryption key, the requestor may be informed by the BAA that the dataset is encrypted and that a decryption key is required to access the data in the dataset. In this latter case where the BAA does not have the key, the BAA may transmit the encrypted dataset to a target array.

In the former case, where the BAA has the decryption key, the BAA may notify 306 the target array that the backup dataset is EEE, and this notification may be received 308 at the target array. The target array may then configure 310 a storage volume for EEE to accommodate the EEE dataset.

The BAA may next send the decrypted backup dataset 312 to the target array. In some embodiments, even if the BAA has the key, the BAA may not decrypt, decompress, or dedup, the backup dataset before sending the backup dataset to the target array. Rather, in such embodiments, the BAA may simply transmit the encrypted backup dataset and the key to the target array, and decryption, decompression, and/or dedup, may be performed at the target array.

After receipt of the backup dataset from the BAA, the storage array may then restore 314 the backup dataset to one or more EEE-enabled target volumes of the storage array. Before, or after, such restoration, if the backup dataset was received in an encrypted state, the storage array may decrypt, decompress, and dedup, the data of the backup dataset.

D. Further Example Embodiments

Following are some further example embodiments of the invention. These are presented only by way of example and are not intended to limit the scope of the invention in any way.

Embodiment 1. A method, comprising: receiving, by a backup appliance, a request concerning a dataset; performing, by the backup appliance, an inquiry to determine if end-to-end encryption is enabled for a volume of a target storage array; receiving, by the backup appliance, confirmation from the storage array that end-to-end encryption is enabled for the volume; and based on the confirmation that end-to-end encryption is enabled for the volume, storing the dataset in the volume without performing encryption, compression, or deduplication, of the dataset prior to storage of the dataset in the volume.

Embodiment 2. The method as recited in embodiment 1, wherein the inquiry is performed using an INQ command.

Embodiment 3. The method as recited in any of embodiments 1-2, further comprising marking, by the backup appliance, data in the dataset as end-to-end encryption enabled after receipt of confirmation from the storage array that end-to-end encryption is enabled for the volume.

Embodiment 4. The method as recited in any of embodiments 1-3, further comprising processing, by the backup appliance, the dataset, wherein the processing is performed in response to the request and comprises restoring the dataset to a volume.

Embodiment 5. The method as recited in any of embodiments 1-4, further comprising, in response to the request, the backup appliance enabling user access to a backup image of the dataset.

Embodiment 6. The method as recited in any of embodiments 1-5, wherein the dataset is encrypted, and further comprising: after the receiving of the confirmation, receiving, by the backup appliance from the storage array, an encryption/decryption key for the encrypted dataset; and storing, at the backup appliance, the encrypted dataset.

Embodiment 7. The method as recited in embodiment 6, further comprising storing the encryption/decryption key together with the encrypted dataset.

Embodiment 8. The method as recited in any of embodiments 1-7, further comprising receiving, by the backup appliance, a request to restore the backup dataset to a target storage array, notifying, by the backup appliance, the target storage array that data in the backup dataset is marked as end-to-end encryption enabled, and transmitting, by the backup appliance, the encrypted backup dataset and the encryption/decryption key to the target storage array.

Embodiment 9. A method for performing any of the operations, methods, or processes, or any portion of any of these, disclosed herein.

Embodiment 10. A non-transitory storage medium having stored therein instructions that are executable by one or more hardware processors to perform operations comprising the operations of any one or more of embodiments 1-9.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
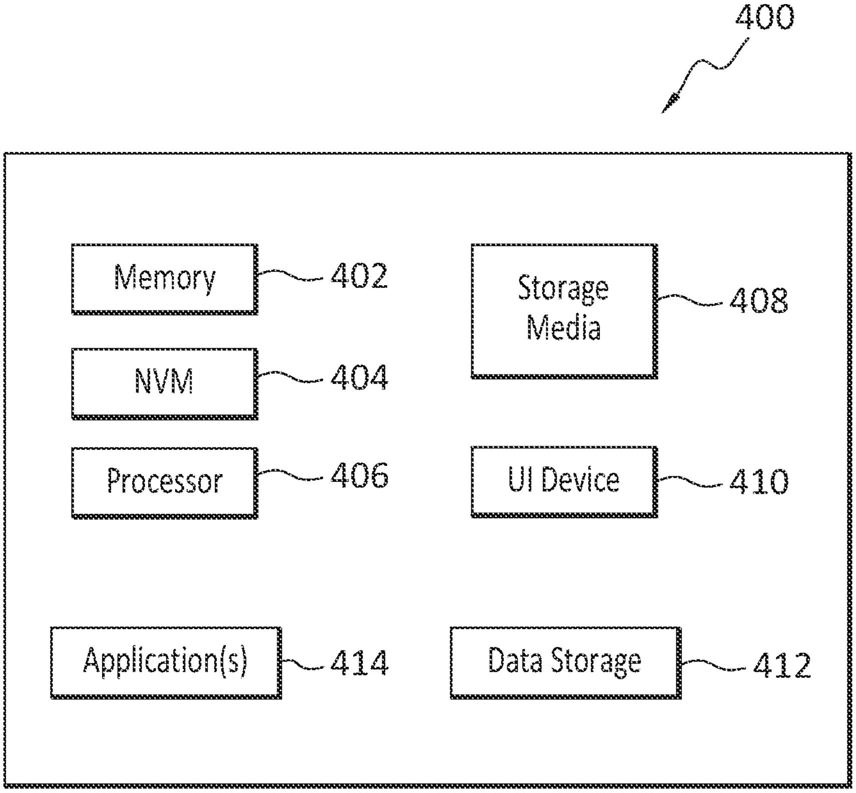
FIG. 4 discloses aspects of an example computing entity operable to perform any of the disclosed methods and processes.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:

one or more processors; and one or more non-transitory hardware storage devices that store instructions that are executable by the one or more processors to cause the computer system to:

receive, from a requestor by a backup appliance, a request concerning a backed up dataset; and either:

when the backup appliance has a decryption key:

notify, by the backup appliance, a target array that the backed up dataset is an end-to-end (EEE) dataset; and transmit, by the backup appliance to the target array, the backed up dataset; or when the backup appliance does not have the decryption key:

inform, by the backup appliance and in response to the request, the requestor that access to the backed up dataset is denied because the backed up dataset is encrypted and the backup appliance does not possess the decryption key required to access data in the backed up dataset; and transmit, by the backup appliance to the target array, the backed up dataset.

2. The computer system of claim 1, wherein the target array is different from a domain where the backed up dataset was initially created.

3. The computer system of claim 1, wherein the request comprises a request for image access.

4. The computer system of claim 1, wherein, when the backup appliance has the decryption key, the backup appliance sends the decryption key to the target array along with the backed up dataset.

5. The computer system of claim 1, wherein the request comprises a restore request.

6. The computer system of claim 1, wherein the notifying concerning the EEE dataset acts to trigger the target array to configure a storage volume to accommodate the EEE dataset.

7. The computer system of claim 1, wherein at a time when the request is received, the backed up dataset resides at a storage array volume for which end-to-end encryption has been enabled.

8. The computer system of claim 1, wherein the backed up dataset was created by the backup appliance.

9. The computer system of claim 1, wherein when the backup appliance has a decryption key, decrypting, by the backup appliance, the backed up dataset using the decryption key.

10. The computer system of claim 1, wherein, when the backup appliance has a decryption key, the backed up dataset is decrypted, decompressed, or deduped, before being transmitted to the target array.

11. A non-transitory storage medium having stored therein instructions that are executable by one or more hardware processors to perform operations comprising:

receiving, from a requestor by a backup appliance, a request concerning a backed up dataset; and either:

when the backup appliance has a decryption key:

notifying, by the backup appliance, a target array that the backed up dataset is an end-to-end (EEE) dataset; and transmitting, by the backup appliance to the target array, the backed up dataset; or when the backup appliance does not have the decryption key:

informing, by the backup appliance and in response to the request, the requestor that access to the backed up dataset is denied because the backed up dataset is encrypted and the backup appliance does not possess the decryption key required to access data in the backed up dataset; and transmitting, by the backup appliance to the target array, the backed up dataset.

12. The non-transitory storage medium as recited in claim 11, wherein the target array is different from a domain where the backed up dataset was initially created.

13. The non-transitory storage medium as recited in claim 11, wherein the request comprises a request for image access.

14. The non-transitory storage medium as recited in claim 11, wherein when the backup appliance has the decryption key, the backup appliance sends the decryption key to the target array along with the backed up dataset.

15. The non-transitory storage medium as recited in claim 11, wherein the request comprises a restore request.

16. The non-transitory storage medium as recited in claim 11, wherein the notifying concerning the EEE dataset acts to trigger the target array to configure a storage volume to accommodate the EEE dataset.

17. The non-transitory storage medium as recited in claim 11, wherein at a time when the request is received, the backed up dataset resides at a storage array volume for which end-to-end encryption has been enabled.

18. The non-transitory storage medium as recited in claim 11, wherein the backed up dataset was created by the backup appliance.

19. The non-transitory storage medium as recited in claim 11, wherein when the backup appliance has a decryption key, decrypting, by the backup appliance, the backed up dataset using the decryption key.

20. The non-transitory storage medium as recited in claim 11, wherein when the backup appliance has a decryption key, the backed up dataset is decrypted, decompressed, or deduped, before being transmitted to the target array.

* * * * *